United States Patent
Higashi

(10) Patent No.: US 9,407,103 B2
(45) Date of Patent: Aug. 2, 2016

(54) BATTERY CHARGER NOISE REDUCTION BY VARIABLE FREQUENCY

(71) Applicant: Nissan North America, Inc., Franklin, TN (US)

(72) Inventor: Kazuyuki Higashi, Farmington Hills, MI (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 150 days.

(21) Appl. No.: 14/200,999

(22) Filed: Mar. 7, 2014

(65) Prior Publication Data

US 2015/0256012 A1 Sep. 10, 2015

(51) Int. Cl.
*H02J 7/00* (2006.01)
*H02J 7/02* (2016.01)

(52) U.S. Cl.
CPC *H02J 7/0052* (2013.01); *H02J 7/02* (2013.01)

(58) Field of Classification Search
CPC .................................. H02J 7/0052; H02J 7/02
USPC .......................................... 320/107, 134, 141
See application file for complete search history.

(56) References Cited

U.S. PATENT DOCUMENTS

| | | | |
|---|---|---|---|
| 4,692,668 A * | 9/1987 | Brown | H05B 41/34 315/241 S |
| 7,696,714 B2 | 4/2010 | Sterk | |
| 8,633,615 B2 * | 1/2014 | Lee | H02J 5/005 235/451 |
| 8,643,330 B2 | 2/2014 | Nergaard et al. | |
| 9,257,851 B2 * | 2/2016 | Baarman | H02J 5/005 |
| 2007/0019442 A1 * | 1/2007 | Li | H02J 1/08 363/15 |
| 2008/0122518 A1 * | 5/2008 | Besser | H02J 3/382 327/518 |
| 2009/0174263 A1 * | 7/2009 | Baarman | H02J 5/005 307/104 |
| 2009/0184681 A1 | 7/2009 | Kuno | |
| 2010/0102642 A1 | 4/2010 | Odaohhara et al. | |
| 2010/0208501 A1 * | 8/2010 | Matan | H02J 3/18 363/95 |
| 2011/0043160 A1 * | 2/2011 | Serban | G05F 1/67 320/101 |
| 2011/0172859 A1 | 7/2011 | Sankaran et al. | |
| 2011/0291489 A1 * | 12/2011 | Tsai | H02J 17/00 307/104 |

(Continued)

FOREIGN PATENT DOCUMENTS

| | | |
|---|---|---|
| EP | 0483894 A1 | 5/1992 |
| JP | 2002338197 A | 11/2002 |

(Continued)

OTHER PUBLICATIONS

Tse et al, "A Comparative Study of Carrier-Frequency Modulation Techniques for Conducted EMI Suppression in PWM Converters", IEEE Transations on Industrial Electronics, vol. 49, No. 3, Jun. 2002, pp. 618-627.*

(Continued)

*Primary Examiner* — Phallaka Kik
(74) *Attorney, Agent, or Firm* — Young Basile Hanlon & MacFarlane, P.C.

(57) ABSTRACT

A method of charging a battery in a charging system having a power convertor that converts AC electrical power to DC electrical power, the method comprising generating a carrier signal having a carrier frequency that continuously varies between a minimum carrier frequency value and a maximum carrier frequency value, and operating a switching component of the power convertor using the carrier signal.

20 Claims, 5 Drawing Sheets

(56) References Cited

U.S. PATENT DOCUMENTS

| | | | |
|---|---|---|---|
| 2011/0292697 A1* | 12/2011 | Alexander | H02M 5/275 363/37 |
| 2012/0026771 A1 | 2/2012 | Imura et al. | |
| 2012/0286724 A1* | 11/2012 | Tsai | H02J 7/025 320/108 |
| 2013/0026955 A1 | 1/2013 | Kikunaga et al. | |
| 2013/0049666 A1 | 2/2013 | Osugi | |
| 2013/0057209 A1 | 3/2013 | Nergaard et al. | |
| 2013/0082536 A1* | 4/2013 | Taylor | H02J 7/025 307/104 |
| 2013/0144477 A1 | 6/2013 | Yamada et al. | |
| 2014/0265617 A1* | 9/2014 | Roy | H01F 38/14 307/104 |
| 2014/0300313 A1* | 10/2014 | Nishiwaki | H02J 7/025 320/108 |
| 2015/0051750 A1* | 2/2015 | Kurs | G05F 1/625 700/298 |

FOREIGN PATENT DOCUMENTS

| | | |
|---|---|---|
| JP | 2004048844 A | 2/2004 |
| JP | 2005130614 A | 5/2005 |
| JP | 2006333572 A | 12/2006 |
| JP | 2009303288 A | 12/2009 |

OTHER PUBLICATIONS

Huber, L., Jovanovic, M.; "Methods of Reducing Audible Noise Caused by Magnetic Components in Variable-Frequency-Controlled Switch-Mode Converters", IEEE Transactions on Power Electronics, vol. 26, No. 6, Jun. 2011, pp. 1673-1681.

Noro, M., Koizumi, S.; "Present Application and Future Possibilities of Quick Charger for Electric Vehicle", SAE International by Nissan Motor Co Ltd., May 17, 2011, Paper #2011-39-7250.

* cited by examiner

BATTERY CHARGER NOISE REDUCTION BY VARIABLE FREQUENCY

BACKGROUND

Rechargeable batteries are used for many purposes. As one example, electric vehicles are becoming common. Electric vehicles commonly include rechargeable battery packs that are charged when the vehicle is not in use.

Battery chargers are utilized to recharge batteries to restore electrical power that has been depleted during use. For certain applications, such as charging electric vehicles, quick charging systems are used to quickly charge rechargeable batteries. As an example, if the charging time for an electric vehicle is 12-16 hours using a 120 volt AC charger or 6-8 hours using a 240 volt AC charger, the same vehicle could be charged in as little as thirty minutes using a 480 volt (Direct Current) DC quick charger. A typical DC quick charger includes a power convertor that converts AC power to DC power. This can be done, in part, using magnetic switching components. When operated, however, these components can generate significant levels of audible noise. With respect to applications such as electric vehicles, these chargers will often be located in public places where high noise levels may not be acceptable.

SUMMARY

The disclosure relates to systems and methods for reducing audible noise associated with battery chargers.

One aspect of the disclosed embodiments is a method of charging a battery in a charging system having a power convertor that converts AC electrical power to DC electrical power. The method includes generating a carrier signal having a carrier frequency that continuously varies between a minimum carrier frequency value and a maximum carrier frequency value and operating a switching component of the power convertor using the carrier signal.

Another aspect of the disclosed embodiments is a battery charging apparatus having a power convertor that converts AC electrical power to DC electrical power. The apparatus includes a carrier signal generator that outputs a carrier signal having a carrier frequency that continuously varies between a minimum carrier frequency value and a maximum carrier frequency value and one or more switching components that are operated by the carrier signal.

BRIEF DESCRIPTION OF THE DRAWINGS

The description herein makes reference to the accompanying drawings wherein like reference numerals refer to like parts throughout the several views, and wherein.

DETAILED DESCRIPTION

In a battery charging system having a power convertor that coverts AC electrical power to DC electrical power, the amount of audible noise produced varies during a charging operation. In particular, the amount of noise energy generated is proportional to the amount of power that is being supplied by the charger, which reaches a highest level early in the charging operation before gradually decreasing. The battery charging system includes magnetic switching components that operate at a frequency, and the amount of audible noise generated is further dependent on the frequency. Typically, the battery charging system will operate at a frequency that is referred to herein as a nominal carrier frequency, which is an optimal frequency for operation of the power convertor of the battery charging system. Operating at frequencies lower than the nominal carrier frequency will result in magnetic saturation of the switching components. Operating at frequencies higher than the nominal carrier frequency will result in excess heat generation and possible overheating. The nominal carrier frequency, however, is associated with a higher level of noise generation as compared to surrounding frequencies.

In the systems and methods described herein, the audible noise generated by a charging system is reduced by generating a carrier signal having a frequency that continuously varies between a minimum carrier frequency value and a maximum carrier frequency value, and operating a switching component of the power convertor using the carrier signal. Thus, prolonged operation at the high-noise audible carrier frequency is avoided, while also avoiding prolonged operation at a frequency that could cause magnetic saturation issues or heat issues.

Figure 1:
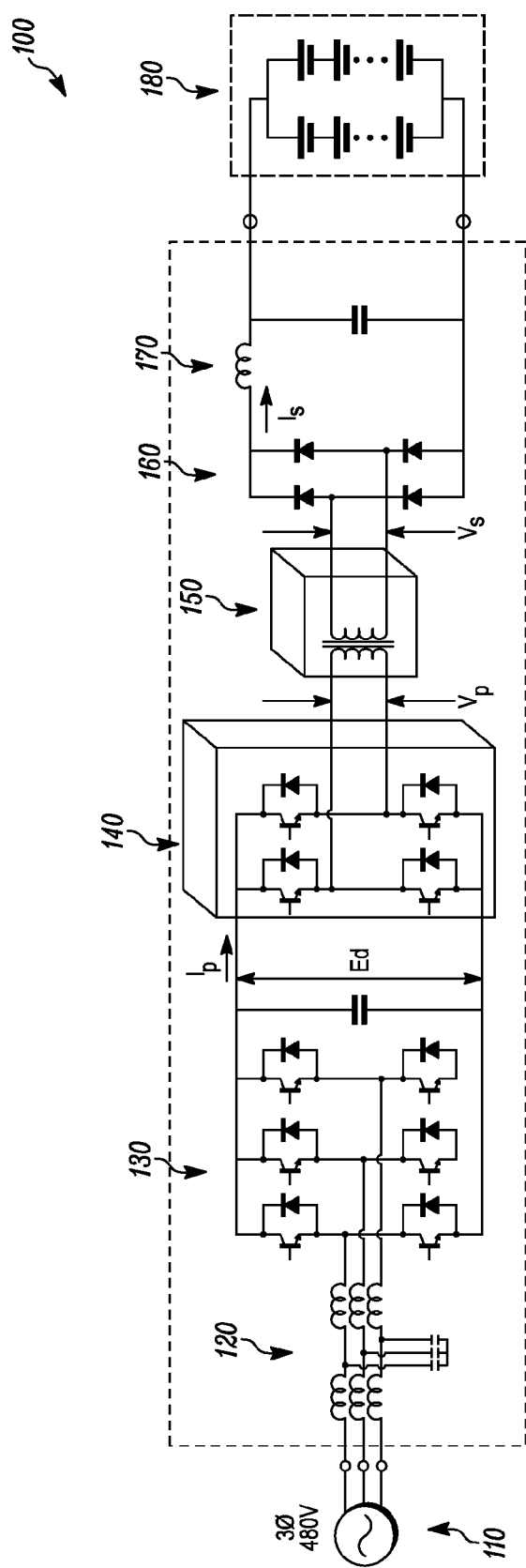
FIG. 1 is an illustration showing a battery charging system having a power convertor.

FIG. 1 shows a battery charging system 100 with which the systems and methods disclosed herein can be implemented. The battery charging system 100 can receive electrical power from a power source 110, such as three-phase AC power source at 480 volts. As an output, the battery charging system 100 supplies a regulated supply of DC electrical power to a battery, such as an electric vehicle battery 180. The battery charging system 100 can be of any suitable configuration. In the illustrated example, the battery charging system 100 includes an AC reactor 120, an inverter 130, a power convertor 140, a transformer 150, a rectifier 160, and a ripple suppressor 170.

Figure 2:
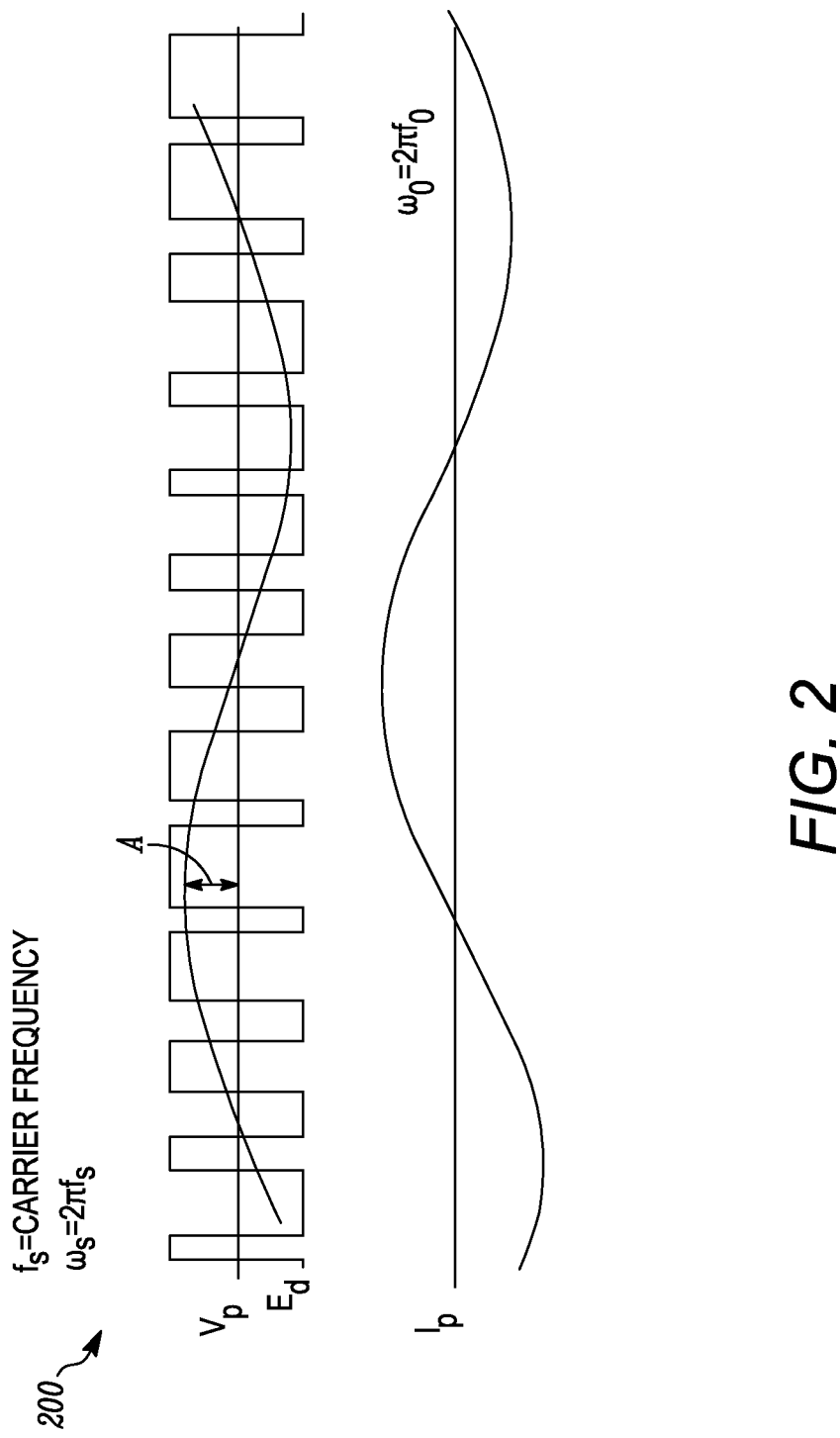
FIG. 2 is an illustration showing a carrier signal by which the power convertor can be operated.

The power convertor 140 includes magnetic switching components that control conversion of the AC power to DC power, and are operated according to a carrier signal, such as a carrier signal 200, as shown in FIG. 2. The carrier signal 200 has a frequency $f_s$ (i.e. the carrier frequency), and an amplitude A. The carrier signal can be a square wave, for setting open and closed states for the switching components. The power convertor 140 can be operated using a carrier signal having an unchanging nominal frequency, or as will be explained herein, can be operated using a variable frequency carrier signal.

Figure 3:
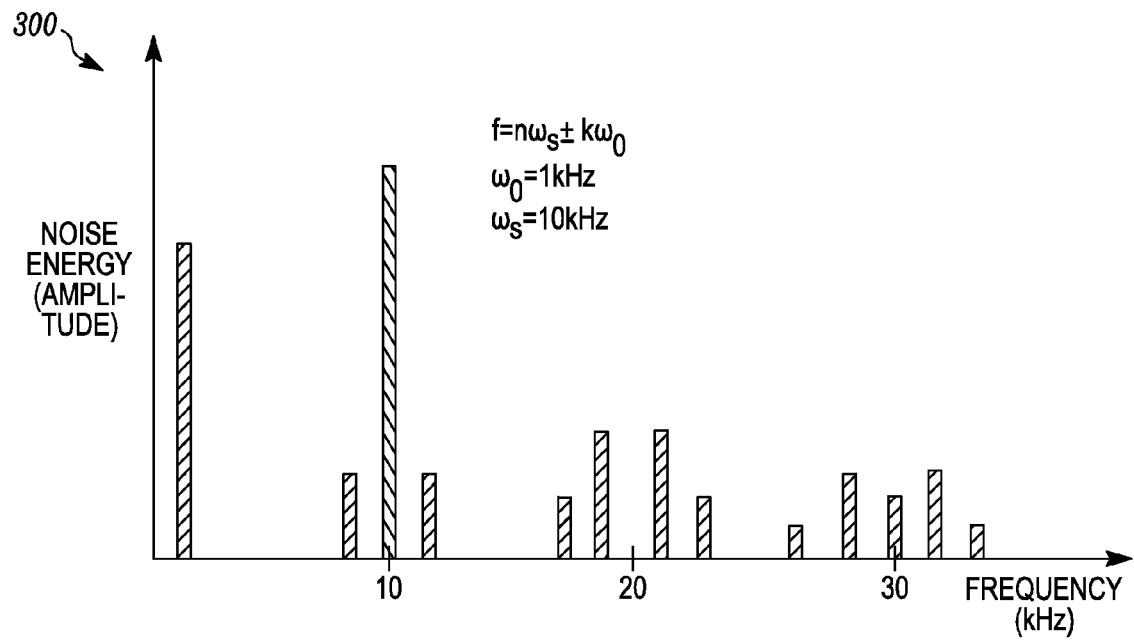
FIG. 3 is a graph showing a relationship between the carrier frequency and the noise energy produced by the power convertor.

FIG. 3 is a graph 300 that demonstrates a relationship between the frequency of the carrier signal at which the power convertor 140 is operated and the noise energy produced by the power convertor 140. The noise energy produced by the power convertor 140 is dependent upon the frequency at which the convertor is operated. At the carrier frequency, which in the illustration is 10 kHz, the noise energy is much greater than at surrounding frequencies. Prolonged operation of the power convertor 140 other than at the nominal carrier frequency, however, can be detrimental to the power convertor 140. In particular, prolonged operation above the nominal carrier frequency is associated with excessive heat generation, which prolonged operation below the nominal carrier frequency can lead to magnetic saturation.

Figure 4:
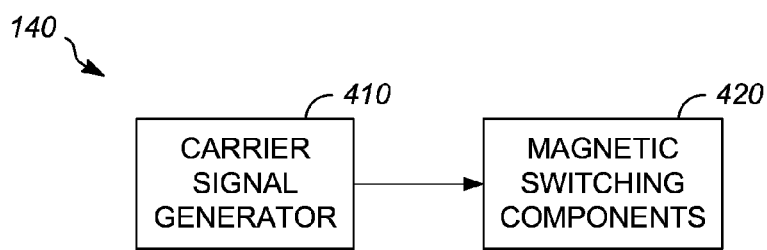
FIG. 4 is a block diagram showing a carrier signal generator and magnetic switching components of the power convertor.

As shown in FIG. 4, the power convertor 140 can include a carrier signal generator 410 and magnetic switching components 420. The carrier signal generator 410 outputs the carrier signal, which can be a variable carrier signal, as will be discussed further herein. The magnetic switching components 420 are used in converting AC power to DC power and are operated (i.e. switched on and off) by the carrier signal.

Figure 5:
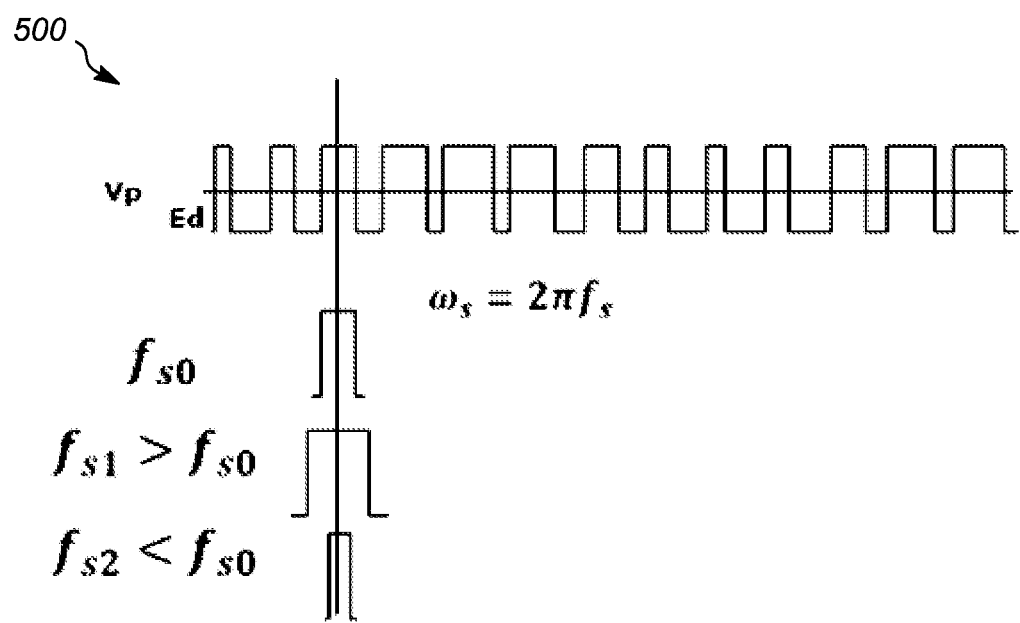
FIG. 5 is an illustration showing a variable frequency carrier signal for operating the power convertor.

The carrier signal generator 410 is operable to output the carrier signal as a variable carrier signal 500, as shown in FIG. 5. The variable carrier signal 500 has a frequency that varies between a maximum carrier frequency value $f_{s2}$ that is higher than the nominal carrier frequency value $f_{s0}$ and a minimum carrier frequency value $f_{s1}$ that is lower than the nominal carrier frequency value $f_{s0}$. This prevents prolonged operation at the nominal carrier frequency $f_{s0}$, which is associated with a high level of audible noise. Thus, by varying the frequency, the overall noise level is decreased. At the same time, the effects of the heat problems and magnetic saturation problems associated with operation at frequencies other than the nominal carrier frequency $f_{s0}$ are minimized.

The minimum carrier frequency $f_{s1}$ and maximum carrier frequency $f_{s2}$ values can be selected such that they each differ from the nominal carrier frequency $f_{s0}$ by the same value. Thus, a difference between the minimum carrier frequency value $f_{s1}$ and the nominal carrier frequency value $f_{s0}$ can be equal to a difference between the nominal frequency value $f_{s0}$ and the maximum carrier frequency value $f_2$. Also, the minimum carrier frequency $f_{s1}$ and maximum carrier frequency $f_{s2}$ values can be selected such that the nominal carrier frequency value $f_{s0}$ is greater than the minimum carrier frequency value $f_{s1}$, the nominal frequency value $f_{s0}$ is less than the maximum carrier frequency value $f_{s2}$, and the nominal frequency value $f_{s0}$ corresponds to maximum noise generation within the frequency value range from the minimum carrier frequency value $f_{s1}$ to the maximum carrier frequency value $f_{s2}$.

A wide range of values could be selected for the minimum carrier frequency $f_{s1}$ and maximum carrier frequency $f_{s2}$ values, based on factors such as noise levels, heat levels, and magnetic saturation levels. In one implementation, the minimum carrier frequency value $f_{s1}$ is at least 20 percent lower than the nominal frequency value $f_{s0}$ and the maximum carrier frequency value $f_{s2}$ is at least 20 percent higher than the nominal frequency value $f_{s0}$. In another implementation, the minimum carrier frequency value $f_{s1}$ is at least 50 percent lower than the nominal frequency value $f_{s0}$ and the maximum carrier frequency value $f_{s2}$ is at least 50 percent higher than the nominal frequency value $f_{s0}$. As an example, the nominal carrier frequency $f_{s0}$ could be 10 kHz, the minimum carrier frequency value $f_{s1}$ could be 5 kHz, and the maximum carrier frequency value $f_{s2}$ could be 145 kHz.

The carrier signal generator 410 can output the variable carrier signal such that it constantly varies between the minimum carrier frequency value $f_{s1}$ and the maximum carrier frequency value $f_{s2}$. For example, the carrier signal generator 410 can output the variable frequency carrier signal by increasing the frequency of each successive cycle of the carrier signal from the minimum carrier frequency value $f_{s1}$ to the maximum carrier frequency value $f_{s2}$ during a first plurality of cycles and decreasing the frequency of each successive cycle from the maximum carrier frequency value $f_{s2}$ to the minimum carrier frequency value $f_{s1}$ during a second plurality of cycles. For example, the variable carrier signal can include four cycles of successive frequency increases, followed by four cycles of successive frequency decreases. Thus, generating the carrier signal can include multiple iterations of a sequence, each including the first plurality of cycles immediately followed by the second plurality of cycles. Of course, the number of cycles required to increase or decrease between the minimum carrier frequency $f_{s1}$ and maximum carrier frequency $f_{s2}$ values can be selected based on various factors as noted previously with respect to selection of the minimum carrier frequency $f_{s1}$ and maximum values.

In some implementations, varying the frequency of the carrier signal continuously between the minimum carrier frequency value $f_{s1}$ and the maximum carrier frequency value $f_{s2}$ can include at least one cycle at the nominal carrier frequency $f_{s0}$. In other implementations, varying the frequency of the carrier signal continuously between the minimum carrier frequency value $f_{s1}$ and the maximum carrier frequency value $f_{s2}$ can be performed with no cycles at the nominal carrier frequency $f_{s0}$.

Figure 6:
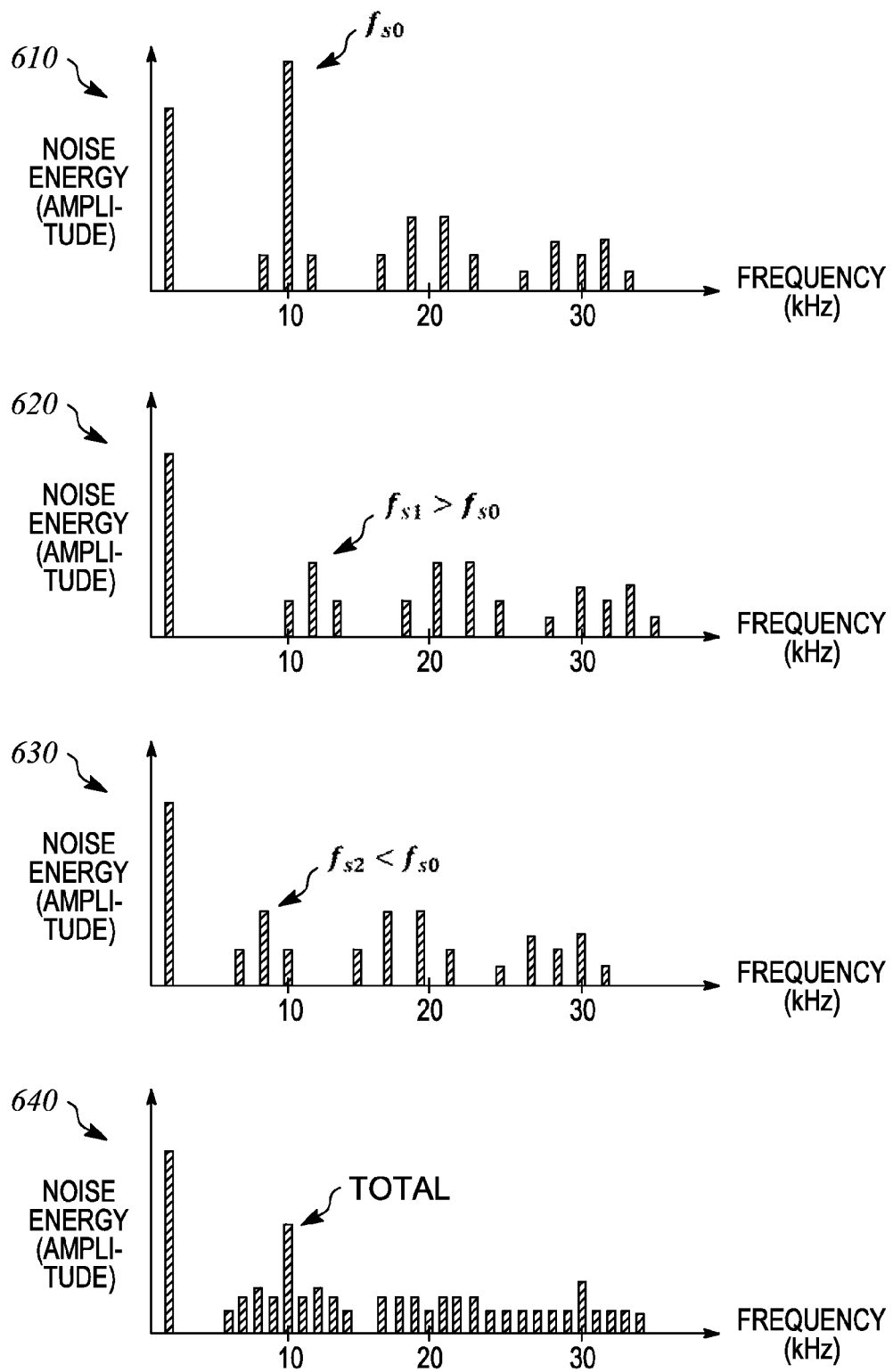
FIG. 6 is an illustration including graphs depicting noise energy levels at a nominal carrier frequency $f_{s0}$, a minimum carrier frequency $f_{s1}$, and a maximum carrier frequency $f_{s2}$.

In operation, the power convertor 140 of the battery charging system 100 can be set to operate in a low-noise operating mode. In the low noise operating mode the frequency of the carrier signal is varied between minimum carrier frequency $f_{s1}$ and maximum carrier frequency $f_{s2}$ values, such as by continuously varying the frequency of the carrier signal with each successive cycle of the carrier signal waveform. As shown in FIG. 6, the nominal carrier frequency $f_{s0}$ produces high noise energy as shown in graph 610. The a minimum carrier frequency $f_{s1}$ produces a low noise energy level as shown in graph 620, and the maximum carrier frequency $f_{s2}$ produces a low noise energy level, as shown in graph 630. As a result of the constantly changing frequency, a total noise energy level between the high and low levels results, as shown in graph 640.

The low noise operating mode can be used throughout the entirety of a charging operation, or for a portion of a charging operation. As an example, the low noise operating mode can be utilized for a determined time period before switching to normal operation with the frequency of the carrier signal set to the nominal carrier frequency value $f_{s0}$. Other modes of operation are possible.

While the description herein is made with respect to specific implementations, it is to be understood that the invention is not to be limited to the disclosed implementations but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A method of charging a battery in a charging system having a power convertor that converts AC electrical power to DC electrical power, the method comprising:
   generating a carrier signal having a carrier frequency that continuously varies between a minimum carrier frequency value and a maximum carrier frequency value; and
   operating a switching component of the power convertor using the carrier signal, wherein the switching component of the power convertor receives AC electrical power from a power source, converts the AC electrical power to DC electrical power, and supplies the DC electrical power to charge a battery.

2. The method of claim 1, wherein generating the carrier signal includes changing the frequency of the carrier signal with each successive wave cycle of the carrier signal by increasing the carrier frequency of each successive wave cycle of the carrier signal from the minimum carrier frequency value to the maximum carrier frequency value during a first plurality of wave cycles and decreasing the carrier frequency of each successive wave cycle from the maximum carrier frequency value to the minimum carrier frequency value during a second plurality of wave cycles.

3. The method of claim 2, wherein generating the carrier signal includes, in the first plurality of wave cycles and the second plurality of wave cycles, at least one wave cycle at a nominal carrier frequency.

4. The method of claim 2, wherein generating the carrier signal is performed such that no wave cycle from the first plurality of wave cycles and the second plurality of wave cycles is performed at a nominal carrier frequency.

5. The method of claim 2, wherein generating the carrier signal includes multiple iterations of a sequence, wherein each iteration of the sequence includes the first plurality of wave cycles immediately followed by the second plurality of wave cycles.

6. The method of claim 1, wherein a nominal carrier frequency value of the carrier signal is greater than the minimum carrier frequency value and is less than the maximum carrier frequency value.

7. The method of claim 6, wherein operation of the charging system at the nominal carrier frequency value causes audible noise at a higher level than operation of the charging system at both of the minimum carrier frequency value and the maximum carrier frequency value.

8. The method of claim 6, wherein the nominal carrier frequency value corresponds to maximum noise generation within a frequency value range from the minimum carrier frequency value to the maximum carrier frequency value.

9. The method of claim 6, wherein the minimum carrier frequency value is at least 20 percent lower than the nominal carrier frequency value and the maximum carrier frequency value is at least 20 percent higher than the nominal carrier frequency value.

10. The method of claim 6, wherein a difference between the minimum carrier frequency value and the nominal carrier frequency value is equal to a difference between the nominal carrier frequency value and the maximum carrier frequency value.

11. A battery charging apparatus having a power convertor that converts AC electrical power to DC electrical power, the apparatus comprising:
 a carrier signal generator that outputs a carrier signal having a carrier frequency that continuously varies between a minimum carrier frequency value and a maximum carrier frequency value; and
 one or more switching components that are operated by the carrier signal, wherein the one or more switching components of the power convertor receive AC electrical power from a power source, convert the AC electrical power to DC electrical power, and supply the DC electrical power to charge a battery.

12. The battery charging apparatus of claim 11, wherein the carrier signal generator changes the frequency of the carrier signal with each successive wave cycle of the carrier signal by increasing the carrier frequency of each successive wave cycle of the carrier signal from the minimum carrier frequency value to the maximum carrier frequency value during a first plurality of wave cycles and decreasing the frequency of each successive wave cycle from the maximum carrier frequency value to the minimum carrier frequency value during a second plurality of wave cycles.

13. The battery charging apparatus of claim 12, wherein the carrier signal generator generates the carrier signal to include, in the first plurality of wave cycles and the second plurality of wave cycles, at least one wave cycle at a nominal carrier frequency value.

14. The battery charging apparatus of claim 12, wherein the carrier signal generator generates the carrier signal such that no wave cycle from the first plurality of wave cycles and the second plurality of wave cycles is performed at a nominal carrier frequency value.

15. The battery charging apparatus of claim 12, wherein generating the carrier signal generator generates the carrier signal such that it includes multiple iterations of a sequence, wherein each iteration of the sequence includes the first plurality of wave cycles immediately followed by the second plurality of wave cycles.

16. The battery charging apparatus of claim 11, wherein a nominal carrier frequency value of the carrier signal is greater than the minimum carrier frequency value and is less than the maximum carrier frequency value.

17. The battery charging apparatus of claim 16, wherein operation of the one or more switching components at the nominal carrier frequency value causes audible noise at a higher level than operation of the one or more switching components at both of the minimum carrier frequency value and the maximum carrier frequency value.

18. The battery charging apparatus of claim 16, wherein the nominal carrier frequency value corresponds to maximum noise generation within a frequency value range from the minimum carrier frequency value to the maximum carrier frequency value.

19. The battery charging apparatus of claim 16, wherein the minimum carrier frequency value is at least 20 percent lower than the nominal carrier frequency value and the maximum carrier frequency value is at least 20 percent higher than the nominal carrier frequency value.

20. The battery charging apparatus of claim 16, wherein a difference between the minimum carrier frequency value and the nominal carrier frequency value is equal to a difference between the nominal carrier frequency value and the maximum carrier frequency value.

* * * * *